(12) United States Patent
Mitsumata et al.

(10) Patent No.: US 7,552,908 B2
(45) Date of Patent: Jun. 30, 2009

(54) SOLENOID DRIVE APPARATUS

(75) Inventors: Naoki Mitsumata, Takahama (JP); Fumiaki Murakami, Okazaki (JP)

(73) Assignee: DENSO CORPORATION, Kariya (JP)

( * ) Notice: Subject to any disclaimer, the term of this patent is extended or adjusted under 35 U.S.C. 154(b) by 89 days.

(21) Appl. No.: 11/520,635

(22) Filed: Sep. 14, 2006

(65) Prior Publication Data

US 2007/0057221 A1  Mar. 15, 2007

(30) Foreign Application Priority Data

Sep. 15, 2005  (JP)  ............................. 2005-268532

(51) Int. Cl.
*F16K 31/02* (2006.01)
(52) U.S. Cl. .................. 251/129.15; 277/629
(58) Field of Classification Search ............ 251/129.15; 277/629
See application file for complete search history.

(56) References Cited

U.S. PATENT DOCUMENTS

| | | | | |
|---|---|---|---|---|
| 3,124,725 A | * | 3/1964 | Lenguillon | ................... 335/303 |
| 3,189,675 A | * | 6/1965 | Moore et al. | ................... 251/65 |
| 3,406,979 A | * | 10/1968 | Weber | ........................ 277/629 |
| 3,470,892 A | * | 10/1969 | Barker | ........................ 251/333 |
| 3,491,790 A | * | 1/1970 | Sanford | ........................ 251/65 |
| 4,020,803 A | * | 5/1977 | Thuren et al. | ............ 123/90.11 |
| 5,257,791 A | * | 11/1993 | Cittadini et al. | ............. 277/629 |
| 5,310,160 A | * | 5/1994 | Harck et al. | ............ 251/129.15 |
| 5,575,485 A | * | 11/1996 | Merla et al. | ................... 277/629 |
| 5,826,883 A | * | 10/1998 | Cho et al. | ................... 277/410 |
| 6,039,323 A | * | 3/2000 | Mockenhaupt et al. | ...... 277/593 |
| 6,429,560 B1 | * | 8/2002 | Oelsch | ........................ 277/629 |
| 6,655,698 B2 | * | 12/2003 | Nozaki et al. | ................ 277/629 |
| 6,664,877 B2 | * | 12/2003 | Sato et al. | .............. 251/129.15 |
| 6,667,435 B1 | * | 12/2003 | French et al. | .................. 251/65 |

FOREIGN PATENT DOCUMENTS

| | | |
|---|---|---|
| FR | 2164287 | 7/1993 |
| JP | 2001-138351 | 5/2001 |
| JP | 2001-182638 | 7/2001 |

OTHER PUBLICATIONS

EPO Search Report dated Dec. 7, 2006.
Examination Report dated Oct. 19, 2007 in the corresponding CN Application No. 2006101515960 with partial English translation.

* cited by examiner

*Primary Examiner*—John Bastianelli
(74) *Attorney, Agent, or Firm*—Nixon & Vanderhye, PC

(57) ABSTRACT

A solenoid drive apparatus for driving a driven member by a magnetic attractive force includes a tubular magnetic metallic body, a coil, a magnetic metallic plate, and a magnetic gasket. The tubular magnetic metallic body has an opening portion at one end. The coil is received in the body from the opening portion and provides a magnetic field when the coil is energized. The magnetic metallic plate closes the opening portion of the body. The magnetic gasket is held between the body and the plate.

8 Claims, 3 Drawing Sheets

SOLENOID DRIVE APPARATUS

CROSS REFERENCE TO RELATED APPLICATION

This application is based on and incorporates herein by reference Japanese Patent Application No. 2005-268532 filed on Sep. 15, 2005.

BACKGROUND OF THE INVENTION

1. Field of the Invention

The present invention relates to a solenoid drive apparatus that generates a magnetic force when the apparatus is energized.

2. Description of Related Art

A conventional solenoid drive apparatus includes a magnetic metallic body 1, a coil 2 and a metallic plate 3, as shown in FIG. 5. The body 1 houses the coil 2 and an opening portion of the body 1 is closed by the plate 3. The solenoid drive apparatus further includes a rubber sealing member 100, such as an O-ring, in order to limit water from entering from an exterior (see e.g., Japanese Unexamined Patent Publication No. 2001-182638). Here, the rubber sealing member 100 usually has a thickness of 1.5 mm or more.

However, the conventional solenoid drive apparatus has suffered from a degradation of a magnetic property (attractive force, responsibility) because of a magnetic block caused by the rubber sealing member 100, which is non-magnetic and has a large thickness. As a result, the conventional solenoid drive apparatus needs to have a larger coil 2 to compensate the degraded magnetic property. Also, a receiving groove 29, to which the rubber sealing member 100 is provided, has needed to be machined.

Further, there has been a fear of fault sealing because the sealing member 100 sometimes sticks out of the receiving groove 29 when the coil 2 is assembled to the body 1 or the plate 3. Further, there has been a fear of another fault sealing because a surface of the sealing member 100 is worn due to a friction of the sealing member 100 with the body 1 or the plate 3 when the coil 2 is assembled to the body 1 or the plate 3.

SUMMARY OF THE INVENTION

The present invention is made in view of the above disadvantages. Thus, it is an objective of the present invention to address at least one of the above disadvantages.

To achieve the objective of the present invention, there is provided a solenoid drive apparatus for driving a driven member by a magnetic attractive force, the solenoid drive apparatus including a tubular magnetic metallic body, a coil, a magnetic metallic plate, and a magnetic gasket. The tubular magnetic metallic body has an opening portion at one end. The coil is received in the body from the opening portion and provides a magnetic field when the coil is energized. The magnetic metallic plate closes the opening portion of the body. The magnetic gasket is held between the body and the plate.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 1:
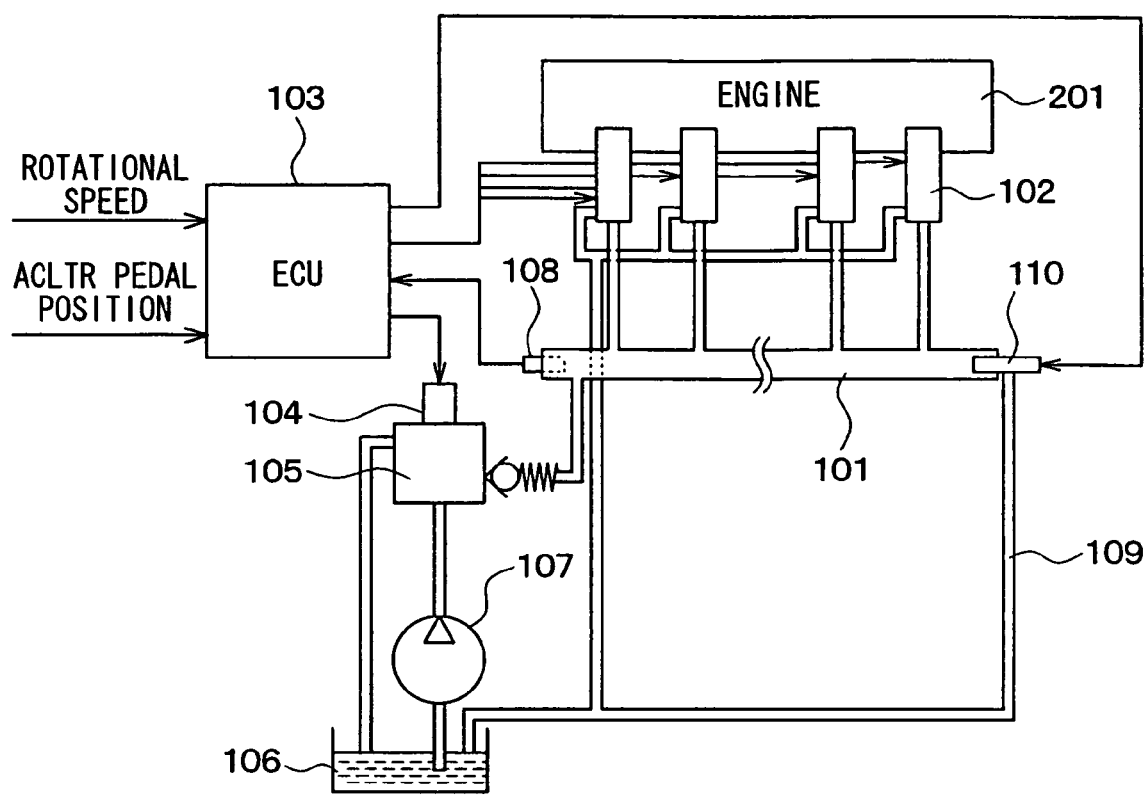
FIG. 1 is a schematic diagram of a common rail fuel injection system, which includes a solenoid drive apparatus according to a first embodiment of the present invention.

As shown in FIG. 1, a common rail fuel injection system having a solenoid drive apparatus of a first embodiment includes an accumulator 101, a diesel engine (internal combustion engine) 201, multiple injection valves 102, and an electronic control unit (ECU) 103. The accumulator 101 accumulates high-pressure fuel. The accumulator 101 is connected with each of the injection valves 102, which is provided to a corresponding one of cylinders of the internal combustion engine 201. Thus, the high-pressure fuel accumulated in the accumulator 101 is injected into the corresponding cylinder through each injection valve 102. The ECU 103 controls open timing and a valve open period of the injection valve 102.

The ECU 103 includes a known microcomputer, which has a CPU, a ROM, and RAM, and is not shown. The microcomputer in turn executes various processes stored in the microcomputer. The ECU 103 receives information, such as an engine rotational speed and a depressing amount (a pedal position) of an accelerator pedal (not shown). Then, the ECU 103 controls operations of the injection valves 102, a pump amount control valve 104, and a pressure control valve 110 based on the information.

The high-pressure fuel, which is pumped by a fuel pump 105, is accumulated in the accumulator 101 at a predetermined pressure that corresponds to injection pressure of fuel. A variable delivery high-pressure pump, which has a known structure, serves as the fuel pump 105, and the fuel pump 105 compresses low-pressure fuel at high pressure. Here, the low-pressure fuel is supplied from a fuel tank 106, which serves as a low-pressure portion, through a feed pump 107. Based on signals supplied from a pressure sensor 108, the ECU 103 drives the pump amount control valve 104 to control a pump amount such that the injection pressure becomes a predetermined value, which is determined based on a load and the rotational speed. Here, the pump amount control valve 104 is provided to the fuel pump 105, and the pressure sensor 108 is provided to the accumulator 101.

The accumulator 101 is connected with the fuel tank 106 through a low-pressure passage 109, which constitutes a discharge passage. The pressure control valve 110 is located between the low-pressure passage 109 and the accumulator 101. The ECU 103 controls the pressure control valve 110 based on an operational state of the internal combustion engine 201. The high-pressure fuel in the accumulator 101 is returned to the fuel tank 106 through the low-pressure passage 109 when the valve is opened so that the pressure inside the accumulator 101 can be reduced to a target value.

Figure 2:
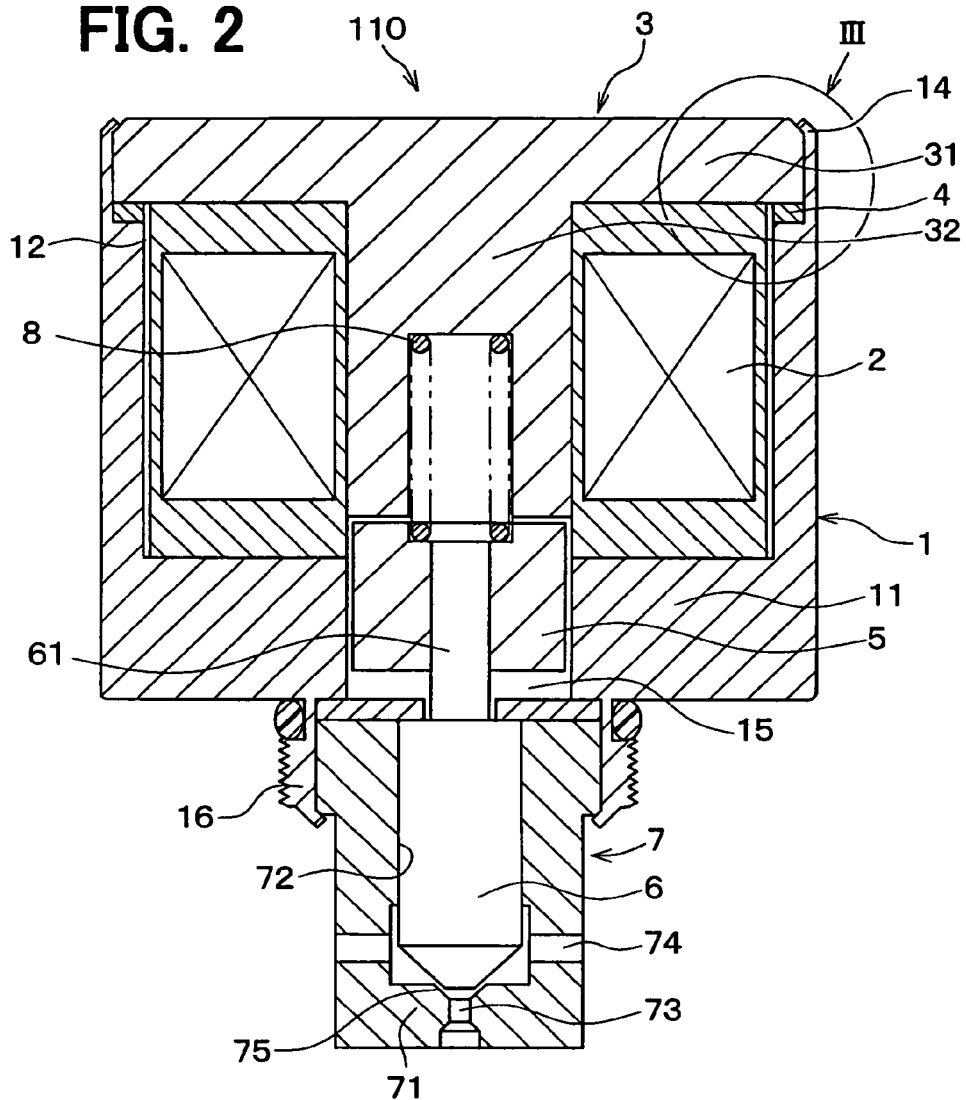
FIG. 2 is a sectional view showing a structure of a solenoid valve having the solenoid drive apparatus according to the first embodiment of the present invention.
Figure 3:
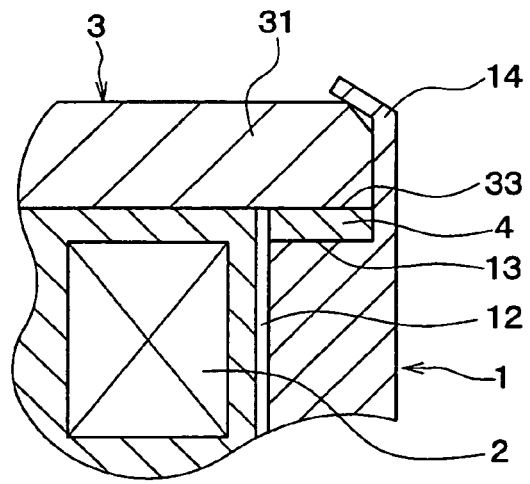
FIG. 3 is an enlarged view of a portion III in FIG. 2.

Next, the pressure control valve 110 will be described. FIG. 2 is a sectional view showing a structure of a solenoid valve (the pressure control valve 110) having the solenoid drive apparatus according to the first embodiment of the present invention. As shown in FIGS. 2 and 3, the pressure control valve 110 of the present embodiment includes a cylindrical body 1 with a bottom and a valve housing 7. The body 1 includes a bottom portion 11 at one longitudinal end and an opening portion 12 at another longitudinal end. A tubular coil 2, which forms (provides) a magnetic field when energized, is inserted into the body 1 from the opening portion 12 and is housed in the body 1. The opening portion 12 of the body 1 is closed by the plate 3. The plate 3 includes a disc lid portion 31 and a columnar portion 32. The lid portion 31 covers the opening portion 12 of the body 1, and the columnar portion 32 extends from a radial center portion of the lid portion 31 into a space inside the tubular coil 2.

A flat annular gasket 4, which seals a mating surface between the body 1 and the plate 3, is held between the body 1 and the plate 3. More specifically, as shown in FIG. 3, the body 1 has a body end surface 13 on one side of the body 1, the one side facing the opening portion 12. Also, the plate 3 has a plate end surface 33, which faces the body end surface 13. The gasket 4 is held between the body end surface 13 and the plate end surface 33. Here, the body end surface 13 and the plate end surface 33 are planes, which are perpendicular to a longitudinal direction of the body 1.

The body includes a cylindrical tubular portion 14, which surrounds the opening portion 12 and the body end surface 13. An end portion of the cylindrical tubular portion 14 is crimped after the coil 2, the plate 3, and the gasket 4 have been temporally assembled inside the body 1. Thus, the plate 3 is fixed to the body 1, and the gasket 4 is compressedly held between the body 1 and the plate 3.

The body 1, the plate 3, and the gasket 4 are all magnetic metal and form a magnetic circuit. The gasket 4 is made of a less hard material than materials of the body 1 and the plate 3 (the gasket 4 has lower hardness than the body 1 and the plate 3). Typically, in the present embodiment, carburized chrome steel is used for the body 1, a stainless raw material is used for the plate 3, and cold-rolled steel is used for the gasket 4.

A through hole 15 is formed at a radial center portion of the bottom portion 11 and communicates with the space inside the coil 2 (i.e., the space formed inside the tubular coil 2). An armature 5 is located in the through hole 15 of the bottom portion 11. The armature 5 is magnetic metal and constitutes the magnetic circuit.

As shown in FIG. 2, the pressure control valve 110 includes the valve housing 7 outside of the bottom portion 11 of the body 1. The valve housing 7 houses and holds a cylindrical valve body 6. The valve housing 7 has an opening end-on one side and a bottom portion 71 at another end such that the valve housing 7 has a cylindrical shape with a bottom. At a radial center portion of the valve housing 7, the valve housing 7 includes a slide bore 72, which extends in a longitudinal direction of the valve housing 7 and slidably receives the valve body 6. The body 1 includes a cylindrical tubular portion 16 outside the bottom portion 11. The valve housing 7 is fixed to the body 1 by cramping an end portion of the tubular portion 16.

The valve housing 7 includes a first discharge passage 73 at a radial center portion of the bottom portion 71. The first discharge passage 73 extends in the longitudinal direction and extends through the bottom portion 71. Also, at a cylindrical portion of the valve housing 7, the valve housing 7 includes a second discharge passage 74, which extends in a radial direction of the valve housing 7 and extends through the cylindrical portion. The bottom portion 71 of the valve housing 7 includes a tapered seat surface 75, which is formed coaxially with the first discharge passage 73 and faces the valve body 6. When the valve body 6 engages with the seat surface 75, the first discharge passage 73 is disconnected from the second discharge passage 74. When the valve body 6 disengages from the seat surface 75, the first discharge passage 73 is communicated with the second discharge passage 74.

The valve body 6 integrally includes a cylindrical rod 61, which extends into the through hole 15 of the body 1, and the armature 5 is fitted and fixed to an outer periphery of the rod 61. The columnar portion 32 of the plate 3 receives a spring 3 inside, and the spring 8 spring biases the armature 5 and the valve body 6 toward a valve closed position such that the valve body 6 disconnects the first discharge passage 73 from the second discharge passage 74.

Here, the first discharge passage 73 is connected to the accumulator 101 (see FIG. 1) and the second discharge passage 74 is connected to the fuel tank 106 (see FIG. 1).

In the above structure, except for a case of reducing a speed of the internal combustion engine 201, the coil 2 of the pressure control valve 110 is deenergized. Thus, the spring 8 spring biases the armature 5 and the valve body 6 toward the valve closed position such that the valve body 6 engages with the seat surface 75 of the valve housing 7. Therefore, the first discharge passage 73 is disconnected from the second discharge passage 74.

In contrast, in a case of suddenly reducing the depressing amount of the accelerator pedal, in other words, in the case of reducing the speed of the internal combustion engine 201, the ECU 103 controls the pressure control valve 110 such that the pressure control valve 110 is opened. Thus, the high-pressure fuel in the accumulator 101 is discharged into the fuel tank 106 and the pressure inside the accumulator 101 is quickly reduced to the target value.

Specifically, the coil 2 of the pressure control valve 110 is energized to form the magnetic field. Then, the magnetic circuit is formed at the body 1, the plate 3, the gasket 4, and the armature 5 such that a magnetic attractive force is generated and therefore, the armature 5 is attracted toward the columnar portion 32 of the plate 3. Thus, the valve body 6, which is integrated with the armature 5, is displaced toward the columnar portion 32. As a result, the valve body 6 is disengaged from the seat surface 75 of the valve housing 7 such that the first discharge passage 73 is communicated with the second discharge passage 74. Then, the high-pressure fuel in the accumulator 101 is discharged into the fuel tank 106 through the first and second discharge passages 73, 74 and the low-pressure passage 109.

In the present embodiment, the gasket 4 is made of the magnetic material so that the magnetic block caused by the gasket 4 is limited and therefore, a degradation of a magnetic property is limited.

Also, a sealing surface of the gasket 4 does not slide relative to other components in an assembly process. Thus, the sealing surface of the gasket is limited from being worn by the other components. Therefore, the sealing performance can be improved.

Figure 5:
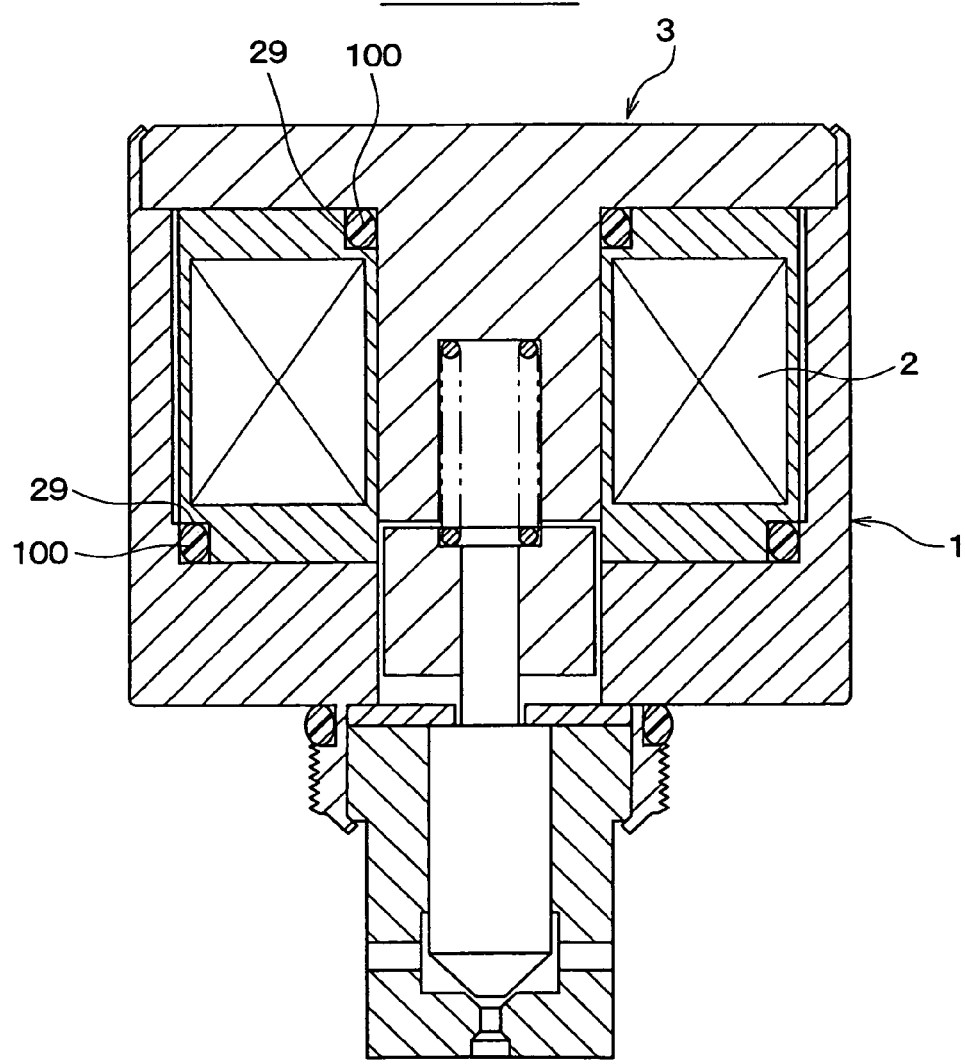
FIG. 5 is a sectional view showing a structure of a solenoid valve having a conventional solenoid drive apparatus.

Also, the solenoid drive apparatus of the present embodiment does not require a receiving groove 29 shown in FIG. 5 nor any equivalent to the receiving groove 29. Thus, manpower for machining can be reduced.

In the present embodiment, the gasket 4 is made of the less hard material than materials of the body 1 and the plate 3.

Thus, the sealing performance can be reliably attained because the gasket 4 can deform to fit to the body 1 and the plate 3.

Second Embodiment

Figure 4:
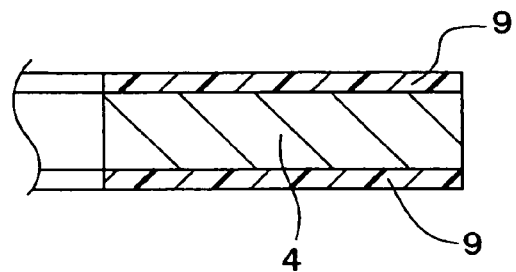
FIG. 4 is a sectional view showing a structure of gaskets for a solenoid drive apparatus according to a second embodiment of the present invention.

A second embodiment of the present invention will be described. FIG. 4 is a sectional view showing a structure of a gasket for a solenoid drive apparatus according to the second embodiment of the present invention. Similar components of the solenoid drive apparatus of the present embodiment, which are similar to the components of the solenoid drive apparatus of the first embodiment, will be indicated by the same numerals.

As shown in FIG. 4, in the present embodiment, flat annular elastic members 9 are joined to opposite surfaces (sides) of the flat annular gasket 4, which is magnetic metal. In other words, one of the elastic members 9 is attached to one face of the gasket 4, the one face facing the body end surface 13 (see FIG. 3). Also, the other of the elastic members 9 is attached to an opposite face of the gasket 4, the opposite face facing the plate end surface 33 (see FIG. 3). Here, hardness of the elastic members 9 is lower than that of the gasket 4.

In the present embodiment, the cold-rolled steel is used for the gasket 4. Acrylonitrile-butadiene rubber (NBR) is used for the elastic members 9. The gasket 4 and the elastic members 9 are joined by use of welding or an adhesive. Because the NBR is not magnetic, a thickness of each elastic member 9 is set 0.15 mm or less such that a degree of the magnetic block due to the elastic members 9 is reduced to limit the degradation of the magnet property.

Alternatively, the elastic member 9 may be made of a magnetic rubber so that the magnetic block due to the elastic member 9 can be limited.

In the present embodiment, the elastic member 9 has lower hardness than the gasket 4. Thus, the sealing performance can be reliably attained because the gasket 4 can easily deform to sealingly fit to the body 1 and the plate 3.

Other embodiment will be described. In each of the above embodiments, the solenoid drive apparatus of the present invention is applied to the solenoid valve (pressure control valve). However, the solenoid drive apparatus of the present invention may be alternatively applied to other devices, which drives other driven member different from a valve.

Additional advantages and modifications will readily occur to those skilled in the art. The invention in its broader terms is therefore not limited to the specific details, representative apparatus, and illustrative examples shown and described.

What is claimed is:

1. A solenoid drive apparatus for driving a driven member by a magnetic attractive force, the solenoid drive apparatus comprising:
   a tubular magnetic metallic body that has an opening portion at one end;
   a coil that is received in the body from the opening portion and provides a magnetic field when the coil is energized;
   a magnetic metallic plate that closes the opening portion of the body;
   a magnetic gasket that is held between the body and the plate, wherein the magnetic gasket is made of steel;
   an armature,
   wherein the magnetic field is formed at the body, the plate, the gasket, and the armature when the coil is energized; and
   an elastic member that is provided on a surface of the gasket, the elastic member having lower hardness than the gasket, wherein the body includes a body end surface at one side of the body, the one side facing the opening portion; the plate includes a plate end surface that faces the body end surface; the gasket has a flat annular shape and is held between the body end surface and the plate end surface; the elastic member has a first thickness dimension in a magnetic-field direction, in which the magnetic field is formed through the elastic member; the magnetic gasket has a second thickness dimension in the magnetic-field direction; and the first thickness dimension is smaller than the second thickness dimension.

2. The solenoid drive apparatus according to claim 1, wherein the gasket has lower hardness than the body and the plate.

3. The solenoid drive apparatus according to claim 1, wherein the elastic member is a rubber and has a thickness of 0.15 mm or less.

4. The solenoid drive apparatus according to claim 1, wherein the elastic member is a magnetic rubber.

5. The solenoid drive apparatus according to claim 1, wherein the armature is provided on an opposite side of the coil with respect to the magnetic gasket.

6. The solenoid drive apparatus according to claim 1, wherein the steel comprises cold-rolled steel.

7. The solenoid drive apparatus according to claim 3, wherein the rubber comprises acrylonitrile-butadiene rubber.

8. The solenoid drive apparatus according to claim 1, wherein said elastic member is provided on each axial surface of the gasket, each said elastic member having a lower hardness than the gasket.

* * * * *